United States Patent
Pech

[11] 3,713,558
[45] Jan. 30, 1973

[54] FLOW METER WITH EXTENSIBLE SCALE

[76] Inventor: R. Dean Pech, Box 284, Route No. 1, Clarksville, Mich. 48815

[22] Filed: Sept. 13, 1971

[21] Appl. No.: 179,999

[52] U.S. Cl. ................................................. 222/20
[51] Int. Cl. ............................................. B67d 5/30
[58] Field of Search .................... 222/17, 20; 235/94

[56] References Cited

UNITED STATES PATENTS 2,289,038  7/1942  Putnam ........................... 235/61 NV

*Primary Examiner*—Stanley H. Tollberg
*Attorney*—William D. Hall et al.

[57] ABSTRACT

The specification discloses a liquid metering and dispensing attachment for dispensing given amounts of fluid when the unit price varies. The amount of flow in value as measured in dollars and cents is translated into degrees of rotation by means of an extensible and retractable computing means. The flow of liquid through the device spins a turbine and the amount of liquid dispensed is also translated thereby into degrees of rotation. When the two are equal, a snap action valve is released thereby shutting off the flow of liquid.

10 Claims, 8 Drawing Figures

INVENTOR
R. Dean Pech

BY

ATTORNEY

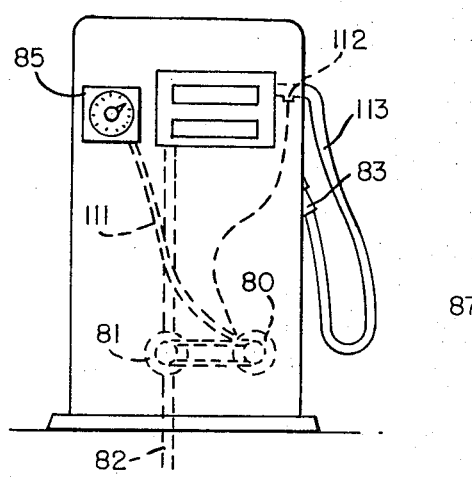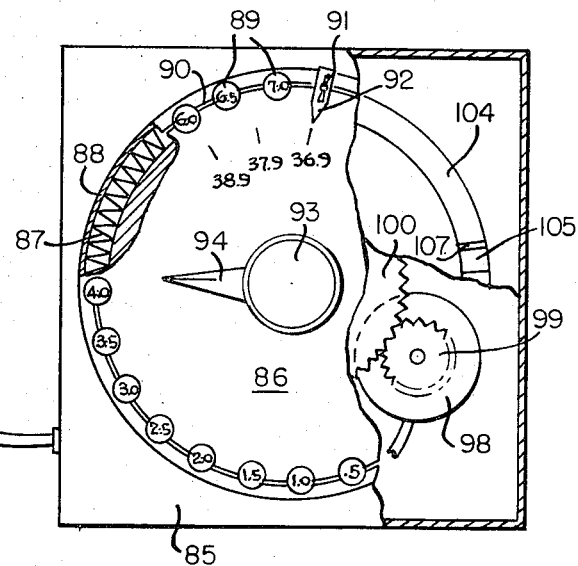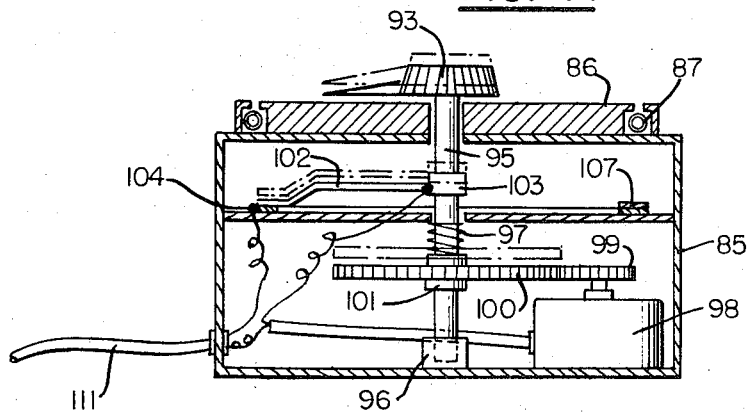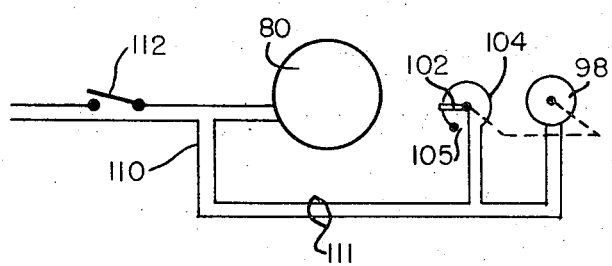

FLOW METER WITH EXTENSIBLE SCALE

BACKGROUND OF THE INVENTION

The current practice in the merchandising of gasoline is to provide a plethora of services to the motorist in an attempt to distinguish between gasoline service companies which sell a product that is basically identical from company to company. In order to perform the necessary services upon the car the attendant must rely on some type of automatic filling device for dispensing gasoline while he attends to cleaning the windshields, checking the oil, battery, water and tires, etc.

The automatic shut off features that are currently utilized in the art have two primary disadvantages. First, they are not always reliable and if malfunctioning to any extent they will spill the gasoline over the side of the customer's car and onto the service station apron. This not only results in a waste of gasoline, but irritates the customer. Since the good will of the station is a primary distinguishing characteristic for the merchandising of gasoline, this is a particularly significant irritation.

The second disadvantage is that occasionally motorists wish a certain prescribed amount of gasoline measured in dollars and cents. The attendant must then stand at the car and manually terminate the flow of gasoline when the amount dispensed has reached the certain predetermined quantity. This reduces the time available for performing the services, and the customer is kept waiting while the services are performed. Additionally, service stations in certain parts of large metropolitan cities are having to turn to a "no change" basis. In other words, the operator carries no cash, and deposits all cash received from motorists in a strongbox immediately upon dispensing the gasoline. This minimizes the risk from hold-ups and felonius assaults.

Various types of measuring and dispensing attachments are well known in the art. Some of these are particularly adapted to be installed between the gasoline nozzle and the gasoline pump. They provide for dispensing a given amount of gasoline measured in either gallons, or in dollars and cents. They also provide a secondary shut off valve which will terminate the flow of gasoline independently from the automatic shut off feature contained in the nozzle. Representative examples of this type of meter are disclosed in U.S. Pat. No. 3,497,106 issued to R. E. Clarke on Feb. 24, 1970; U.S. Pat. No. 3,028,997 issued to M. J. Florio on April 10, 1962; and U.S. Pat. No. 2,998,161 issued to D. A. Quinlan on Aug. 29, 1961.

However, the price of gasoline changes from time to time, and from city to city all across the country. Since the marketing of gasoline is done primarily by large national chains, these devices must be adaptable to meter certain quantities of gasoline as measured in dollar and cents, when the unit price per gallon is highly variable. Additionally, virtually all stations dispense two different grades of gasoline, and some dispense various grades of gasoline through a single nozzle. Each grade is sold at a different price, and some means is necessary to quickly and conveniently set the amount of gasoline to be dispensed in dollars and cents, and compensate for the change in price for each individual customer.

SUMMARY OF THE INVENTION

It is therefore an object of this invention to provide a liquid measuring and dispensing apparatus that will automatically compute the amount of liquid required in units of volume necessary to deliver a fixed quantity of liquid measured in dollars and cents, when the unit price of the liquid per unit of volume is variable.

It is also an object of this invention to provide a measuring and dispensing apparatus which will automatically terminate the flow of gasoline when a predetermined amount of gasoline has been dispensed, said amount being measured in dollars and cents.

It is another object of this invention to provide computing means having an extensible and retractable scale with a plurality of indicia, wherein the amount of liquid in dollars and cents may be translated into degrees of rotation. Given a constant rate of flow, the device also translates the rate of flow, per unit of volume, into degrees of rotation. When the degree of rotation from the computing means has matched the rotation from the metering means, the flow of gasoline is automatically terminated.

It is another object of this invention to provide electrical computing means for installation in the gasoline pump to automatically terminate the flow of gasoline by disconnecting the pump motor after a predetermined amount of gasoline has been dispensed. It is another object of this invention to provide an electrical means for translating the amount of gasoline required in dollars and cents into a specific time constant which is matched against the time constant required to pump a certain amount of fuel at a given rate of flow. It is another object of this invention to provide computing means for computing the amount of liquid in units of volume necessary to deliver a fixed quantity of liquid measured in dollars and cents, when the unit price per unit of volume is variable.

DESCRIPTION OF THE DRAWINGS

FIG. 5 is a front view of an alternate form of my invention as installed on a gasoline dispensing pump.

FIG. 6 is a triple cross section of the alternate form of the liquid measuring and dispensing apparatus illustrated in FIG. 5.

FIG. 7 is a vertical cross section of the liquid measuring and dispensing apparatus illustrated in FIGS. 5 and 6.

FIG. 8 is the electrical circuitry for the form of invention shown in FIGS. 5–7.

DETAILED DESCRIPTION OF THE DRAWINGS

Figure 1:
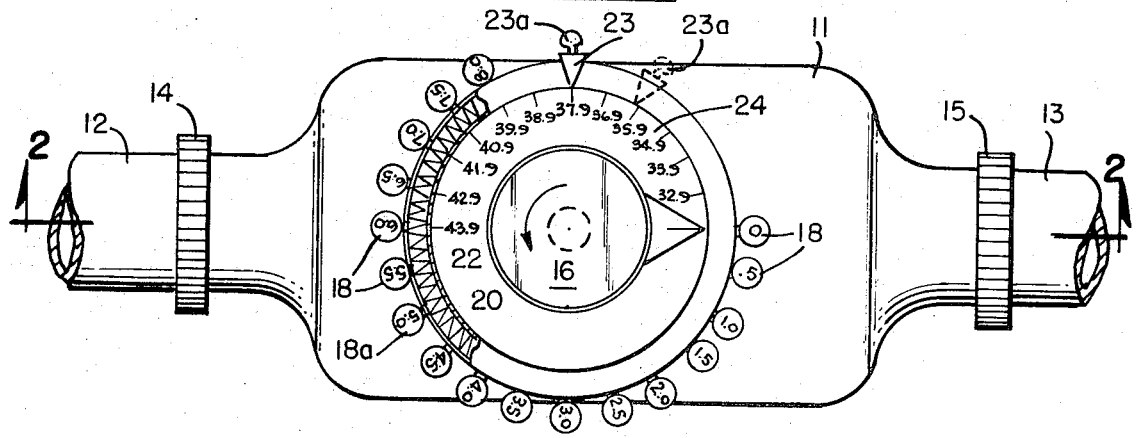
FIG. 1 is a top view, and partial cross section of the liquid measuring and dispensing apparatus of my invention.

The liquid measuring and dispensing apparatus of my invention is disclosed in FIG. 1 with a casing 11 which is coupled to a fluid inlet pipe 12 and a fluid outlet pipe 13 by means of couplers 14 and 15. Mounted on top of the casing is a primary indicating knob 16 which is set by the operator prior to each dispensing operation. The pointer 17 of the primary indicating knob is set to the amount of the sale in dollars and cents as indicated by a plurality of flags illustrated as 18 arranged circularly around the indicating knob 16. These indicating flags travel in an annular path by means of track 19 illustrated in FIG. 2. Referring again to FIG. 1, flags 18 are evenly spaced and securely mounted to extensible and retractable means 20 carried between annular walls 21 and 22. The extensible and retractable means is illustrated in FIG. 1 as a coil spring, however many variants such as elastic cord, accordian pleats, or the like could be used. One end of the extensible means is securely attached at the "0" price level while the other end is firmly attached to the set screw and indicating means 23. Indication means 23 also travels within track 19 and may be quickly and conviently secured by tightening thumb screw 23a. Arranged within the arcuate path defined by spring 20, there is an additional indicating scale 24. Flag means 18 indicates the amount of gasoline to be dispensed. As the price of gasoline varies, scale indicator 23 is moved to the new price, and each of the indicating flags 18 is then linearly displaced to a new location along the periphery of the track defined by walls 21 and 22. Thus it is possible to quickly and effectively change the amount of arcuate rotation as measured in degrees necessary to indicate a given amount of volume measured in dollars and cents as the unit price varies.

Essentially, the computing means indicated generally by numerals 16–24, translate the amount of liquid in units of volume necessary to deliver a fixed quantity of liquid measured in dollars and cents into a given amount of arcuate rotation for knob 16, and pointer 17. As the unit price per a volume is varied, the amount of the rotation necessary to deliver the same quantity measured in dollars and cents is also varied. Given a constant rate of flow, the rotation of the knob 16 may be translated into a specific time constant, for each degree of rotation. The resettability and adjustability of the computing means enables one to vary that time constant as the unit price changes between each dispensing operation.

When an operator wishes to dispense a given amount of gasoline, for example $5.00, and the unit price of the gasoline is to be $0.359 per gallon, the operator moves indicating means 23 from the position shown at 23 to the dotted position illustrated at 23a. The operator then rotates knob 16 clockwise until pointer 17 is aligned with flag 18a which indicates $5.00. After doing so, the handle of the dispensing nozzle is then locked in place as is currently done, and the device will automatically dispense $5.00 worth of gasoline before terminating the flow.

Figure 2:
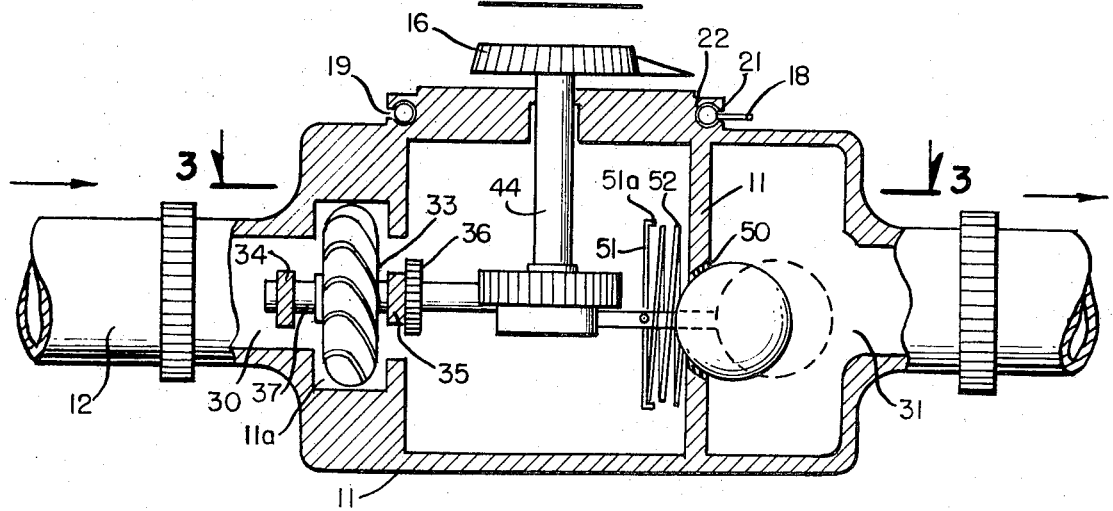
FIG. 2 is a vertical cross section of the liquid measuring and dispensing apparatus illustrated in FIG. 1.
Figure 4:
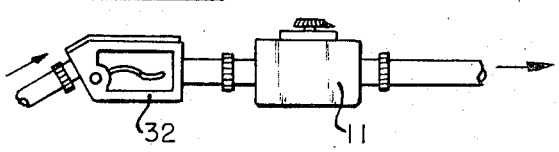
FIG. 4 is a side view of the liquid measuring and dispensing apparatus as installed in a gasoline dispensing line.

Referring to FIG. 2, the gasoline enters through inlet means 30 which is connected to the fluid inlet pipe 12 and exits through outlet means 31 connected to the dispensing nozzle 32 as illustrated in FIG. 4. In actuality, the device is assymetrical, insofar as the flow of fluid is concerned and may be installed with the flow of fluid passing in either direction.

The fluid passing through inlet means 30 is measured by a metering means which comprises a turbine wheel 33 and inlet chamber 11a defined within the casing 11. Turbine wheel 33 rotates on shaft 37 which is journaled for rotation in horizontal support member 34 and wall member 35. As the turbine wheel 33 is rotated by flowing liquid, it drives spur gear 36 attached to the turbine shaft 37.

Figure 3:
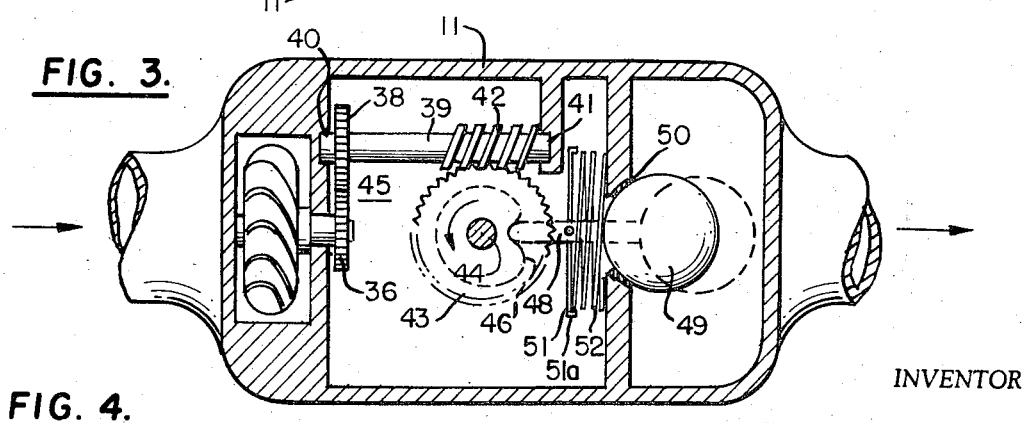
FIG. 3 is a horizontal cross section of the liquid measuring and dispensing apparatus illustrated in FIG. 1.

Referring to FIG. 3, the rotational movement of spur gear 36 is translated to spur gear 38 mounted on shaft 39. Shaft 39 is journaled into casing 11 as indicated at 40 and into support member 41 formed by casing 11. Shaft 39 has in addition to spur gear 38, a worm gear 42 mounted in the center of the housing. Worm gear 42 drives spur gear 43 which is mounted for rotation on shaft 44. Referring again to FIG. 2, shaft 44 is the same shaft on which control knob 16 is mounted. Thus, the metering means defined by turbine wheel 33, casing 11, and shaft 37 is directly coupled to the computing means by means of the transmission means defined generally by numeral 45 in FIG. 3.

A value means and value release means is also disclosed in FIG. 2 and 3. Attached to shaft 44 adjacent spur gear 43 is cam means 46 which has an indent defined in the outer periphery at 47. The cam follower 48 rides on the surface or periphery of cam 46, and when orientated as shown in FIG. 3, slides into the detent 47. Cam follower 48 is attached to ball valve means 49 illustrated in FIGS. 2 and 3. The ball valve seats to casing 11 by means of annular valve seat means 50. Attached to cam follower 48 are a plurality of radiating spring rods illustrated generally by 51. Although four rods are illustrated in FIGS. 2 and 3, any number will be sufficient so long as they serve to retain spring means 52 in the position illustrated in FIGS. 2 and 3. Rods 51 are also equipped with a hook portion 51a which serves to hold the spring means 52 in place, and thereby support with the surface of cam 46 the cam follower 48, and ball valve 49.

When shaft 44 is rotated, cam follower 48 rides to the outer periphery of cam 46 and forces the ball valve 49 away from seat 50 as illustrated by the dotted lines in FIGS. 2 and 3. Thus when the operator makes his first determinative setting, by rotating knob 16, he opens the valve means 49 for fluid flow. When the dispensing handle illustrated in FIG. 4 is activated, fluid will begin to flow through housing 11 from the inlet means 30. This fluid flow will spin the turbine means 33, thereby causing shaft 44 to rotate in a counterclockwise direction. Upon reaching "0," the cam follower 48 will slide into detent 47, thereby shutting off the flow of fluid.

Referring to FIG. 5, an alternate form of the invention is installed upon a gasoline dispensing pump. This form of the invention is illustrated in detail in FIG. 6 and 7. This invention is connected directly between the electrical supply for motor 80, and the motor itself. Motor 80 drives the gasoline pump 81 which pumps gasoline from inlet 82 and dispenses it through nozzle 83. The casing 85 may be mounted on the exterior of the pump as illustrated in FIG. 5, or may be mounted as an integral part of the pump construction.

Referring to FIG. 6, the casing 85 defines on its upper portion a cylindrical disk 86. Around the periphery of disk 86 there is an annular opening 87 which contains therein extensible and retractable means 88. Flags 89 are evenly spaced on the extensible and retractable means around the periphery of the circular disk 86 and travel in track 90. The end of the extensible and retractable means 88 is attached to indicating means 91 which is securely fastened within the track 90 by means of thumb screw 92. The other end of extensible and retractable means is attached at the "O" portion of the indicating scale indicated by flag 89. A second indicating scale is arranged within the annular track 90 and defines the unit price for the liquid to be dispensed. As illustrated in FIG. 6, indicating means 91 is set at a price of $0.369 per gallon for a gallon of premium gasoline. Control knob 93 is set in the center of the circular disk 86 and its pointer 94 is used to indicate the total amount of liquid to be dispensed, as measured in dollars and cents. In operation, the operator merely rotates knob 93 in a clockwise manner to indicate the volume of gasoline to be dispensed, as measured in dollars and cents. In FIG. 6, the operator has moved the control knob 93 to indicate that $3.50 of gasoline is to be dispensed. Referring now to FIG. 4, control knob 93 is attached to shaft 95 which is journaled for rotation in disk 86, and boss 96. The shaft 95 is free to reciprocate up and down a small amount as illustrated by the dotted lines in FIG. 7, but is urged downwardly by means of spring 97. The lower portion of casing 85 contains motor means 98, and a spur gear 99 driven by said motor means. The spur gear in turn drives another large spur gear 100 mounted to shaft 95 by coupling 101. When the operator sets the amount of gasoline to be dispensed in dollars and cents, he raises control knob 93 to disengage spur gear 100 from spur gear 99, and thereby freely rotates shaft 95 to the angular position desired, such as that illustrated in FIG. 6. After designating the amount of gasoline to be dispensed, in dollars and cents, the knob is depressed, and spur gear 99 and 100 is engaged. Referring now to the upper portion of casing 85, as illustrated in FIG. 7, a commutator arm 102 is firmly attached to shaft 95 by means of coupler 103. Coupler 103 is also an insulating coupling to prevent the passage of electricity from the commutator arm 102 to shaft 95. Commutator arm 102 makes electrical contact with a circular switch contact 104 which encircles shaft 95 for 360°. At the "O" point on the shaft, there is a small non-conducting portion indicated by 105 in FIG. 6. This small electrical non-conducting portion has a small stop 107 which serves as a stop for the commutator arm 102.

The electrical circuitry for FIGS. 5, 6, and 7 is indicated in FIG. 8. The incoming line current to motor 80 is broken as indicated at 110. Cable 111 then carries the current to the casing 85 as illustrated in FIG. 7. Once inside casing 85, the line is broken again by switch means 102 and 104. Motor 98 is also placed in series with switch means 102 and 104. Thus when the operator removes the commutator 102 from the non-conducting portion 105 by rotating knob 93, electrical contact is made, which complete the circuit to motors 98 and 80. Once the motor circuits are completed, and once pressure switch 112 is activated, motor 98 will begin to drive shaft 95 to thereby rotate commutator 102 and bring it back around to the non-conductive portion. Upon reaching the non-conductive portion 105 of the switch contact, the circuit is broken and motors 98 and 80 will cease to function. This will discontinue the pumping of gas in the main gasoline pump since the motor 80 drives pump 81. Pressure switch 112 is maintained in the fluid outlet line and is normally the switch which energizes the pump motor 80 to develop the pressure for pumping gasoline through nozzle 83. When the dispensing nozzle is open, the pressure will fall in the flexible conduit 113 thereby energizing pump 80. Alternately, pressure switch 112 may be a condition responsive switch located in the proximity of nozzle 83 to detect when the nozzle has been lifted for dispensing gasoline. Alternately, it could be a remotely positioned switch to be activated by the operator. Alternately, pressure switch 112 could be eliminated by having operator first insert open nozzle into tank and then turn on pump motor by conventional switch apparatus simultaneously activating series arrangement of motor 98 until pre-set amount on timer appraratus is reached.

Although the subject invention has been described with reference to the dispensing of gasoline, it is quite apparent that such a device could also be used to dispense kerosine, or any other liquid from which a certain quantity of liquid is desired at a predetermined price level. The invention is particularly suited to those installations wherein the price level is subject to day to day fluctuations, or fluctuations between each and every dispensing operation.

I claim:

1. A liquid measuring and dispensing apparatus comprising:
   a. a housing, said housing having a fluid inlet and outlet;
   b. metering means mounted within said housing adjacent said fluid inlet, said metering means being activated by the flow of liquid through said housing;
   c. valve means mounted adjacent said fluid outlet, said valve means being operated by a valve release means to completely close the flow of fluid through said fluid outlet;
   d. computing means having an extensible and movable scale for computing the amount of liquid in units of volume necessary to deliver a fixed quantity of liquid measured in dollars and cents, when the unit price per unit of volume is variable;
   e. transmission means for coupling the output of said metering means to said computing means, said transmission means including a valve release means to operate said valve means when the fixed quantity of liquid measured in dollars and cents has been dispensed.

2. A liquid measuring and dispensing apparatus as claimed in claim 1 wherein said metering means further comprises a turbine means mounted on a shaft for rotation within said housing adjacent said fluid inlet, said turbine being rotated by the flow of fluid through said inlet.

3. A liquid measuring and dispensing apparatus as claimed in claim 1 wherein said computing means further comprises a resettable extensible and retractable means, first indicating means carried by said extensible and retractable means, and an indicating knob for selecting indicia carried by said first indicating means.

4. A liquid measuring and dispensing apparatus as claimed in claim 1 wherein said computing means further comprises a rotatable timing shaft with an indicating knob, wherein the angular degree of rotation determines the time constant at any given rate of flow.

5. A liquid measuring and dispensing apparatus as claimed in claim 4 wherein said transmission means couples the output of said meter means to said rotatable timing shaft, said rotatable timing shaft having means for energizing said value release means when said shaft has completed its angular rotation.

6. A liquid measuring and dispensing apparatus comprising:
   a. an electric pump means having a fluid inlet and a fluid outlet with a dispensing nozzle fitted thereto;
   b. computing means having an extensible and movable scale for computing the amount of liquid in units of value necessary to deliver a fixed quantity of liquid measured in dollars and cents, when the unit price per unit of value is variable between dispensing operations;
   c. switch means for coupling the output of said computing means to said electric pump means;
   d. whereby a given amount of fluid measured in dollars and cents may be dispensed automatically, even though the value of said fluid changes between dispensing operations.

7. A liquid measuring and dispensing apparatus as defined in claim 6 wherein said computing means further comprises a resettable, extensible and retractable means, indicating means carried by said extensible and retractable means and a second indicating means for selecting indicia carried by said first indicating means.

8. A liquid measuring and dispensing apparatus as defined in claim 7 wherein said second indicating means further comprises a rotatable timing shaft with an indicating knob, wherein the angular degree of rotation of said shaft determines the time constant at any given rate of flow.

9. A liquid measuring and dispensing apparatus as defined in claim 8 wherein said switch means comprises an annular switch contact surrounding said rotatable timing shaft and a commutator contact arm attached to said shaft to contact said annular switch contact during rotation.

10. A liquid measuring and dispensing apparatus as defined in claim 9 wherein said rotatable timing shaft is rotated by electric drive means.

* * * * *